(12) United States Patent
McCarty

(10) Patent No.: US 10,440,059 B1
(45) Date of Patent: Oct. 8, 2019

(54) EMBEDDING CONTEXTS FOR ON-LINE THREATS INTO RESPONSE POLICY ZONES

(71) Applicant: VERISIGN, INC., Reston, VA (US)

(72) Inventor: Benjamin Glen McCarty, Washington, DC (US)

(73) Assignee: VERISIGN, INC., Reston, VA (US)

( * ) Notice: Subject to any disclaimer, the term of this patent is extended or adjusted under 35 U.S.C. 154(b) by 121 days.

(21) Appl. No.: 15/466,807

(22) Filed: Mar. 22, 2017

(51) Int. Cl.
*H04L 29/00* (2006.01)
*H04L 29/06* (2006.01)

(52) U.S. Cl.
CPC .......... *H04L 63/20* (2013.01); *H04L 63/1433* (2013.01)

(58) Field of Classification Search
CPC ............. H04L 63/1416; H04L 63/1441; H04L 63/1433; H04L 63/1408; H04L 63/20; H04L 2463/142; H04L 41/16
See application file for complete search history.

(56) References Cited

U.S. PATENT DOCUMENTS

| | | | | |
|---|---|---|---|---|
| 2014/0282847 | A1* | 9/2014 | Blacka | H04L 61/1511 726/1 |
| 2015/0350229 | A1* | 12/2015 | Mitchell | H04L 63/1425 726/23 |
| 2016/0050182 | A1* | 2/2016 | Edross | H04L 63/0272 726/15 |
| 2016/0261631 | A1* | 9/2016 | Vissamsetty | H04L 63/1491 |

* cited by examiner

*Primary Examiner* — Ghazal B Shehni
(74) *Attorney, Agent, or Firm* — Artegis Law Group, LLP

(57) ABSTRACT

In one embodiment, a response policy zone (RPZ) application generates an RPZ that includes contexts for the on-line threats that are associated with domain names. For a domain name that is associated with an on-line threat, the RPZ application determines a threat specification that describes a characteristic of the on-line threat. The RPZ application then generates an alias based on the domain name and the threat specification. Subsequently, the RPZ application generates a domain name system (DNS) resource record that maps the domain name to the alias, includes the resource record in the RPZ, and transmits the RPZ to a DNS name server that implements the RPZ. Upon receiving a DNS query associated with the domain name, the DNS name server generates a DNS response based on the alias. Because the domain name and the threat specification is reflected in the alias, the DNS response automatically provides a relevant context.

20 Claims, 5 Drawing Sheets

```
                                    Threat Intelligence  110
   <stix:STIX_Header>
      <stix:Package_Intent xsi:type="stixVocabs:PackageIntentVocab-1.0">Threat Report</
stix:Package_Intent>
      <stix:Description>Indicator for Poisonlvy</stix:Description>
      <stix:Information_Source>
         <stixCommon:Time>
            <cyboxCommon:Produced_Time>2012-04-12T00:00:00</cyboxCommon:Produced_Time>
         </stixCommon:Time>
      </stix:Information_Source>
   </stix:STIX_Header>
                                              ⋮
   </stix:Indicator>
   <stix:Indicator id="example:indicator-eb28ff69-edb1-4ab1-af6b-afe2708d4c80" timestamp="2012-
04-12T18:16:44.547855+00:00" xsi:type='indicator:IndicatorType' negate="false" version="2.1.1">
      <indicator:Title>Malware-C2</indicator:Title>
      <indicator:Description>Malicious domains and IP owned by actors</indicator:Description>
      <indicator:Observable id="example:Observable-fec4810d-faf1-4b29-97c1-71e8d292caf7">
         <cybox:Observable_Composition operator="AND">
            <cybox:Observable id="example:Observable-d00b3bad-9110-4f98-8f68-f5bfc477bc3c">
               <cybox:Object id="example:DomainName-a84a5824-c137-4372-bfb0-62dea60440b9">
                  <cybox:Properties xsi:type="DomainNameObj:DomainNameObjectType">
                     <DomainNameObj:Value>example.com</DomainNameObj:Value>
                  </cybox:Properties>
               </cybox:Object>
            </cybox:Observable>
                                              ⋮
```

FIGURE 3A

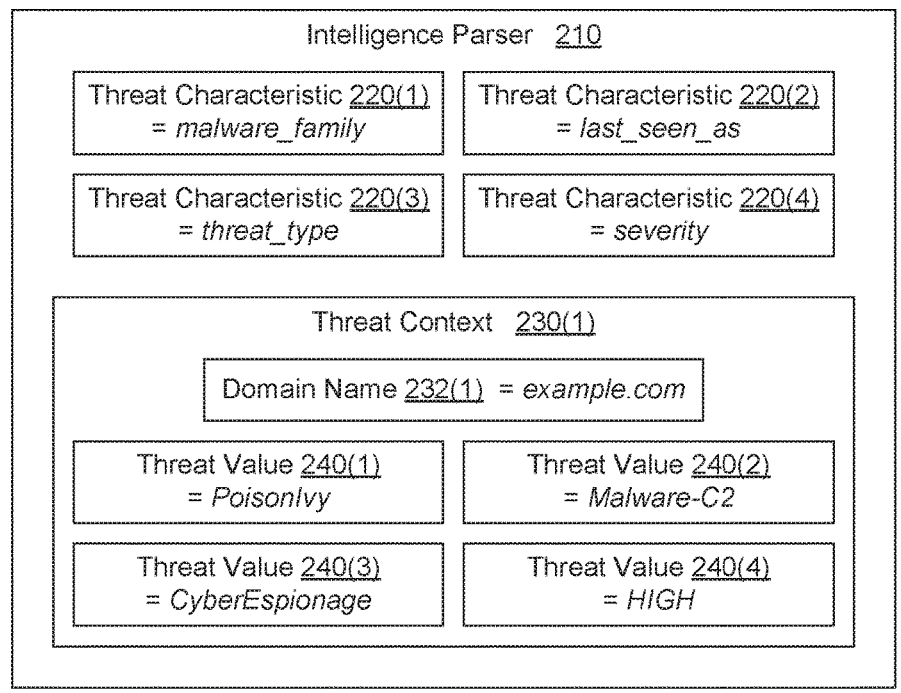

FIGURE 3B

EMBEDDING CONTEXTS FOR ON-LINE THREATS INTO RESPONSE POLICY ZONES

BACKGROUND OF THE INVENTION

Field of the Invention

Embodiments of the present invention relate generally to computer networks and, more specifically, to embedding contexts for on-line threats into response policy zones.

Description of the Related Art

Many on-line threats use the domain name system (DNS) to conduct malicious activities via the Internet. The DNS is the part of the Internet infrastructure that translates human-readable domain names into the Internet Protocol (IP) addresses needed to establish TCP/IP (Transmission Control Protocol/Internet Protocol) communication over the Internet. In operation, a recursive resolver typically translates a particular domain name included in a DNS query to a corresponding IP address included in a DNS response. As persons skilled in the art will recognize, during this "DNS resolution process," many on-line threats attempt to use the DNS to conduct malicious activities via the Internet. Examples of on-line threats include threats that disable targets, infect targets with malware, and access unauthorized information and network resources via targets, to name a few.

To mitigate these types of on-line threats, response policy zones are oftentimes implemented. A response policy zone (RPZ) configures a recursive resolver to override the normal DNS resolution process for "malicious" domain names that are thought to be associated with on-line threats. For example, an RPZ could configure a recursive resolver to respond to DNS queries involving a malicious domain name with "unsuccessful" DNS responses indicating that the malicious domain name does not exist even when, in fact, the malicious domain name actually does exist.

One drawback of using RPZs is that DNS responses to DNS queries involving malicious domain names do not provide any context for the on-line threats that are associated with the different malicious domain names. As referred to herein, a context for the on-line threats that are associated with a specific malicious domain name describes any number and combination of content or activities that are thought to be non legitimate. A context for the on-line threats that are associated with a malicious domain name could describe any number and combination of severities, types of threats, and threat families, to name a few. For example, one malicious domain name could be associated with malware that represents a high severity threat, and another malicious domain name could be associated with inappropriate adult content that represents a low severity threat.

Identifying and assessing the context for the on-line threats that are associated with a malicious domain name is integral to determining how to address the on-line threats in a comprehensive manner. For example, if a system administrator determines that a given system is a target of ongoing high severity threats that are attempting to obtain confidential data from the system, then the system administrator could temporarily disable access to that system and encrypt the confidential data.

One approach to providing contexts for the on-line threats that are associated with malicious domain names involves manually correlating the malicious domain names associated with unsuccessful DNS responses with a threat database. The threat database categorizes each malicious domain name based on the on-line threats that are associated with the malicious domain name. However, manually correlating the malicious domain names with the threat database and maintaining the threat database is tedious, time consuming, and error prone. Further, a typical threat database provides only categorization information (e.g., malware) describing the on-line threats that are associated with different malicious domain names and does not indicate any additional contextual information for those on-line threats (e.g., severities). Another approach to providing contexts for the on-line threats that are associated with malicious domain names involves manually configuring a correlation application to automatically identify malicious domain names and correlate the malicious domain names with the threat database. However, correlation application implementations suffer from the same problems that hinder the effectiveness of primarily manual implementations.

As the foregoing illustrates, what is needed in the art are more effective techniques for establishing and providing relevant contexts for the on-line threats that are associated with malicious domain names.

SUMMARY OF THE INVENTION

One embodiment of the present invention sets forth a method for providing contexts for on-line threats that are associated with domain names. The method includes determining a specification of a first threat characteristic of an on-line threat based on threat intelligence information, where the on-line threat is associated with a first domain name; generating a first alias based on the first domain name and the specification of the first threat characteristic; generating a first DNS resource record that maps the first domain name to the first alias; and transmitting a response policy zone (RPZ) that includes the first DNS resource record to a DNS name server that implements the RPZ to mitigate on-line threats.

Further embodiments provide, among other things, a computer-readable medium and a system configured to implement the method set forth above.

One advantage of the disclosed techniques is that the DNS name server generates DNS responses that reflect both "malicious" domain names and the context of the on-line threats that are associated with the malicious domain names. Accordingly, determining how to address the on-line threats in a comprehensive manner does not involve time consuming operations associated with correlating DNS responses and a threat database via conventional manual techniques or conventional threat correlation applications. Further, the alias included in the DNS response may provide more contextual information than is included in a typical threat database.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3D illustrate a sequence of operations performed by the response policy zone application of FIG. 1 when generating a response policy zone, according to various embodiments of the present invention.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
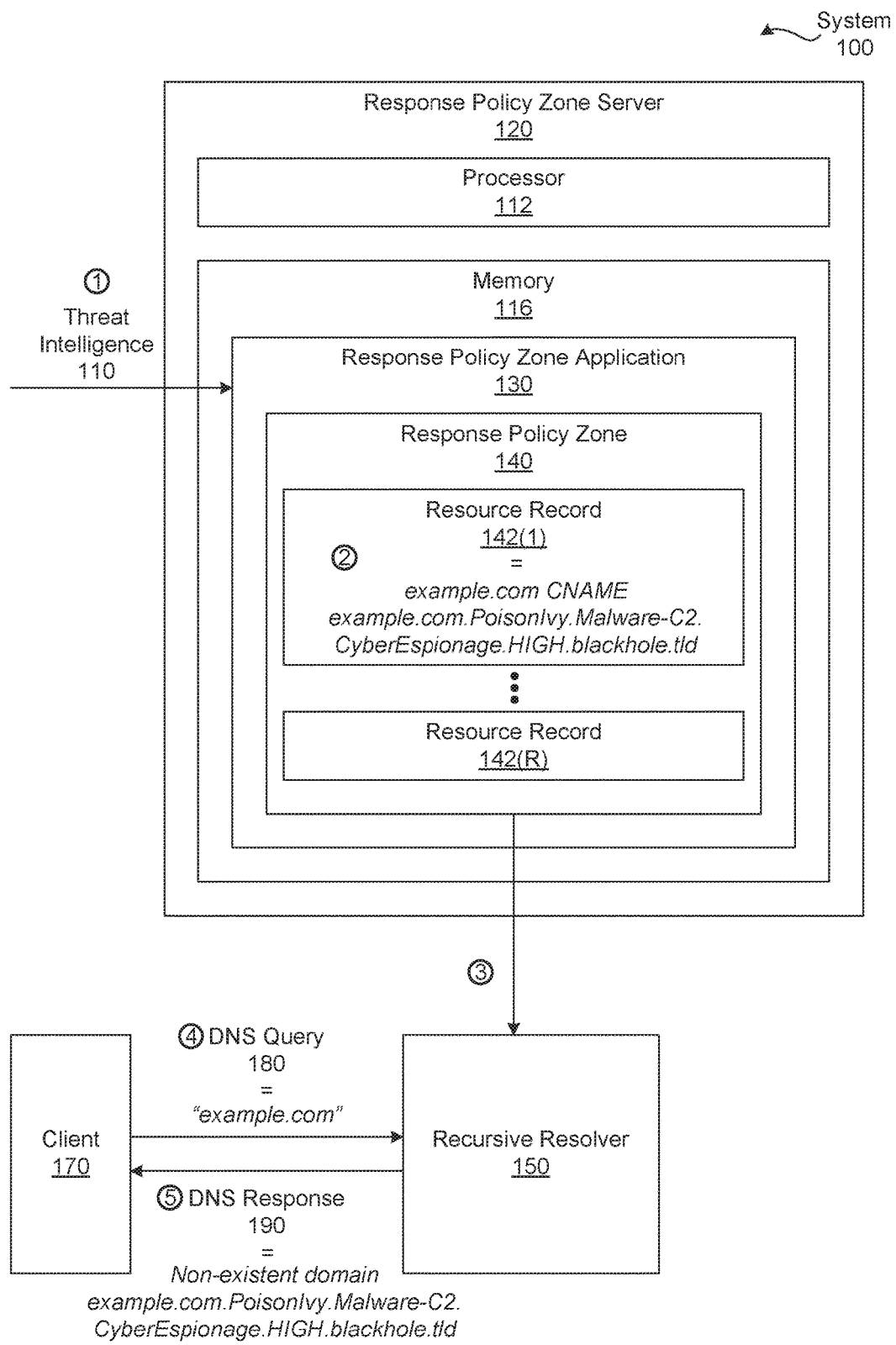
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, a recursive resolver 150, a client 170, and a response policy zone (RPZ) sever 120. In alternate embodiments, the system 100 may include any number of recursive resolvers 150, any number of clients 170, and any number of RPZ servers 120, in any combination. For explanatory purposes, multiple instances of like objects are denoted with reference numbers identifying the object and parenthetical numbers identifying the instance where needed.

As a general matter, the system 100 includes, without limitation, entities and software that provide underlying technologies to support essential Internet functions, such as communications and security. In particular, the recursive resolver 150 provides a portion of a framework that implements the domain name system (DNS) protocol. For explanatory purposes, entities that provide the framework that implements the DNS protocol, including the recursive resolver 150, are referred to herein as "DNS servers." In alternate embodiments, the system 100 may include any number and types of other DNS servers in addition to or instead of the recursive resolver 150. For example, in various embodiments, the system 100 may include stub resolvers, authoritative name servers and forwarding resolvers in addition to the recursive resolver 150.

The DNS is the part of the Internet infrastructure that translates human-readable domain names into the Internet Protocol (IP) addresses needed to establish TCP/IP (Transmission Control Protocol/Internet Protocol) communication over the Internet. The DNS is the mechanism that allows users to refer to websites and other Internet resources via intuitive domain names, such as "example.com," rather than the actual IP addresses, e.g., 192.0.2.78, that are associated with different websites and other Internet resources. As referred to herein, an "Internet resource" may be any type of device or service that is accessible via the Internet.

Each domain name is typically made up of a series of character strings or "subdomain labels," where every two such character strings within the domain name are separated by a period. The right-to-left order of the subdomain labels within a domain name correspond to the top-to-bottom order of domain names in a DNS hierarchy. The right-most subdomain label in a domain name is known as the top-level domain ("TLD"). Examples of well-known TLDs are "com"; "net"; "org"; and the like. Each TLD supports second-level domains, listed immediately to the left of the TLD, e.g., the "example" level in "example.com". Domains can nest within the hierarchy for many levels. To translate a given domain name to a corresponding IP address, the recursive resolver 150 traverses the DNS hierarchy. The process of traversing the DNS hierarchy is referred to herein as a "DNS resolution process." Any DNS server that is involved in the DNS resolution process, including the recursive resolver 150, is also referred to herein as a "DNS name sever."

In general, the DNS enables users to associate a variety of information with domain names based on resource records 142. The resource records 142 are also referred to herein as DNS resource records. For example, in addition to storing address records that map domain names to the corresponding IP addresses, the DNS stores service (SRV) records that identify services and Canonical name (CNAME) records that map domain names to aliases. Further, the DNS stores text (TXT) records that include arbitrary text and enable the DNS to serve as a general purpose database. A hierarchy of the DNS servers included in the system 100 maintain the resource records 142 in large databases.

The client 170 may be any device or service that is capable of transmitting the DNS queries 180 to a DNS server. For example, the client 170 could be a machine or a process executing on a machine, such as a conventional computing device, a tablet, a smart phone, or a wearable technology device, to name a few. To access a resource or information that is associated with a domain name, the client 170 generates a DNS query 180 that includes the domain name and transmits the DNS query 180 to the recursive resolver 150. In response to the DNS query 180, the recursive resolver 150 executes the DNS resolution process to generate a DNS response 190 to the DNS query 180. As part of generating the DNS response 190, the recursive resolver 150 may execute any number of additional operations, including generating additional DNS queries 180, and may store information associated with any number of the operations as a DNS log (not shown).

As persons skilled in the art will recognize, during the DNS resolution process, many on-line threats attempt to use the DNS to conduct malicious activities via the Internet. Examples of on-line threats include threats that disable the client 170, infect the client 170 with malware, and access unauthorized information and network resources via client 170, to name a few. To mitigate these types of on-line threats, response policy zones (RPZs) 140 are often implemented. As shown, the response policy zone (RPZ) 140 includes, without limitation, any number of the resource records 142. Notably, one or more of the resource records 142 configure name servers to override the normal DNS translation process for "malicious" domain names that are thought to be associated with on-line threats. For example, the RPZ 140 could configure the recursive resolver 150 to respond to the DNS query 180 involving a malicious domain name with the "unsuccessful" DNS response 190 indicating that the malicious domain name does not exist even when, if fact, the malicious domain name actually does exist.

One drawback of using conventional RPZs is that the DNS responses to DNS queries involving malicious domain names do not provide any context for the on-line threats that are associated with the different malicious domain names. As referred to herein, a context for the on-line threats that are associated with a specific malicious domain name describes any number and combination of questionable content or activities that are thought to be non legitimate. A context for the on-line threats associated with a malicious domain name could describe any number and combination of severities, types of threats, and threat families, to name a few.

One conventional approach to providing contexts for the on-line threats that are associated the malicious domain names involves manually correlating the malicious domain names associated with unsuccessful DNS responses with a threat database. The threat database categorizes each malicious domain name based on the on-line threats that are associated with the malicious domain name. However, manually correlating the malicious domain names with the threat database and maintaining the threat database is tedious, time consuming, and error prone. Further, a typical threat database provides only categorization information malware) describing the on-line threats that are associated with different malicious domain names and does not indicate any additional contextual information for those on-line threats (e.g., severities). Another approach to providing contexts for the on-line threats that are associated with malicious domain names involves manually configuring a correlation application to automatically identify malicious domain names and correlate the malicious domain names with the threat database. However, correlation application implementations suffer from the same problems that hinder the effectiveness of primarily manual implementations.

Embedding Contexts for On-Line Threats in Response Policy Zones

Because identifying and assessing the contexts for the on-line threats that are associated with malicious domain names is integral to determining how to address the on-line threats in a comprehensive manner, the system 100 includes a response policy zone application 130. The RPZ application 130 comprises a software program that typically resides within a memory 116 that is included in the response policy zone server 120 and is executed by a processor 112 that is included in the RPZ server 120. The RPZ server 120 may be any type of resource or device that is capable of transmitting the RPZ 140 to any DNS name server.

The processor 112 may be any instruction execution system, apparatus, or device capable of executing instructions. For example, the processor 112 could comprise a central processing unit (CPU), a digital signal processor (DSP), a controller, a microcontroller, a state machine, or any combination thereof. The memory 116 stores content, such as software applications and data, for use by the associated processor 112. The memory 116 may be any type of non-volatile memory capable of storing data and software applications, such as a random access memory (RAM), a read-only memory (ROM), an erasable programmable read-only memory (EPROM or Flash ROM), or any suitable combination of the foregoing.

In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In alternate embodiments, the RPZ server 120 may include any number of types of processors 112 and any number and types of memories 116 in any combination. The processor 112 and the memory 116 may be implemented in any technically feasible fashion. For example, and without limitation, in various embodiments, the processor 112 and/or the memory 116 may be implemented as a stand-alone chip or as part of a more comprehensive solution that is implemented as an application-specific integrated circuit (ASIC) or a system-on-a-chip (SoC).

In some embodiments, the RPZ server 120 may interact with a cloud encapsulated shared resources, software, data, etc.) to perform operations associated with the RPZ application 130. In alternate embodiments, the RPZ server 120, the processor 112, and/or the memory 116 may be replaced with any type of distributed computer system or cloud computing environment. In such embodiments, the processor 112 and/or the memory 116 may be implemented in the cloud instead of in the RPZ server 120.

In operation, the RPZ application 130 identifies domain names that are associated with on-line threats in addition to the contexts for the on-line threats that are associated with the identified domain names based on threat intelligence 110. The threat intelligence 110 may include any amount and type of information that enables the RPZ application 130 to associate threats and threat-related data with domain names. The threat intelligence 110 may comprise any number of files, data feeds, etc., and the RPZ application 130 may obtain the information included in the threat intelligence 110 in any technically feasible fashion.

For instance, in some embodiments, the threat intelligence 110 comprises a file that is written in a Structured Threat Information Expression (STIX) format, an Open Indicators of Compromise (OpenIOC) format, or a Cyber Observable Expression (CybOX) format. In general, the RPZ application 130 implements parsing operations based on the structured format associated with the threat intelligence 110 to identify domain names that are associated with on-line threats in additional to contexts for the on-line threats that are associated with the identified domain names.

For each of the identified domain names, the RPZ application 130 generates a corresponding alias based on the identified domain name and the associated context. The context includes threat values for one or more threat characteristics (not shown in FIG. 1). Each threat value is also referred to herein as a specification of a threat characteristic. As part of generating the alias corresponding to a given domain name, the RPZ application 130 generates a subdomain label for each threat value specified in the context associated with the domain name. In general, the subdomain label reflects the threat value in an intuitive manner while complying with DNS restrictions involving subdomain labels.

After generating the subdomain labels, the RPZ application 130 concatenates the subdomain labels with a period delimiter based on a predetermined concatenation order (not shown in FIG. 1) to generate a first string. The RPZ application 130 prepends the identified domain name to the first string with a period delimiter to generate a second string. The RPZ application 130 then appends a predetermined high-level domain name to the second string with a period delimiter to generate the alias. The predetermined high-level domain name may be any domain name that is associated with the RPZ application 130 and may or may not specify a domain that exists in the DNS (i.e., maps to an IP address). In this fashion, the RPZ application 130 embeds the identified domain name, the context for the on-line threats that are associated with the identified domain name, and the high-level domain name into the alias.

Subsequently, for each of the identified domain names, the RPZ application 130 generates a Canonical name (CNAME) record that maps the identified domain name to the corresponding alias. As persons skilled in the art will recognize, the CNAME record is a type of resource record 142 that configures a name server to replace the identified domain name with the alias during the DNS resolution process. In alternate embodiments, the RPZ application 130 may generate any number and type of resource records 142 that map the identified domain names to the corresponding aliases.

In various embodiments, the RPZ application 130 may generate any number of additional resources records 142 and include the additional resource records 142 in the RPZ 140. For example, for each identified domain name, the RPZ application 130 could generate an additional CNAME record that maps the subdomains of the domain name to the corresponding alias via a wildcard character. In another example, for each identified domain name, the RPZ application 130 could generate an additional CNAME record that maps the corresponding alias to a period to indicate that the alias 262 does not map to an IP address.

After the RPZ application 130 includes the CNAME records in the RPZ 140, the RPZ application 130 transmits the RPZ 140 to the recursive resolver 150. The RPZ application 130 may transmit the RPZ 140 to the recursive resolver 150 in any technically feasible fashion. For example, the alias engine 250 could transmit an entirety of the RPZ 140 via an Authoritative Zone Transfer (AXFR). Alternatively or subsequently, the alias engine 250 could transmit portions of the RPZ 140 via any number of Incremental Zone Transfers (IXFRs).

After enabling the RPZ 140, the recursive resolver 150 overrides the normal DNS resolution process for the domain names that are associated with on-line threats based on the resource records 142 included in the RPZ 140. More precisely, upon receiving the DNS query 180 including a domain name that is associated with an on-line threat, the recursive resolver 150 maps the domain name to the corresponding alias. The recursive resolver 150 continues the DNS resolution process based on the alias and, consequently, the DNS response 190 reflects the alias.

Notably, if no other resource records 142 involve the alias, then the alias does not specify a domain that exists in the DNS. For example, if there is no address resource record 142 that maps the alias to an IP address, then the alias does not specify a domain that exists in the DNS. Accordingly, the DNS response 190 and any associated DNS log specify that the alias is a non-existent domain. Advantageously, because the alias includes the identified domain name as well as the context for the on-line threats that are associated with the identified domain name, the DNS response 190 automatically correlates the identified domain name to the associated context.

In various embodiments, the recursive resolver 150 may enable any number of additional RPZs (not shown) that may further configure the recursive resolver 150 to override the normal DNS resolution process via any number of additional resource records 142. In particular, the additional RPZ may be structured to work together with the RPZ 140 to tailor the DNS resolution process for the recursive resolver 150 or the client 170. For example, the client 170 could provide a client-specific RPZ that maps aliases that are created by the RPZ application 130 to a walled garden associated with the client 170. Upon receiving the DNS query 180 including a domain name that is associated with an on-line threat, the recursive resolver 150 would map the domain name to a corresponding alias based on the RPZ 140. Subsequently, the recursive resolver 150 would map the alias to the walled garden based on the client-specific RPZ.

For explanatory purposes only, FIG. 1 depicts a sequence of events that provide a context for the on-line threats that are associated with the domain name "example.com" via the RPZ 140 using a series of circles labeled 1-5. First, as depicted with the circle labeled 1, the RPZ application 130 receives the threat intelligence 110. As depicted with the circle labeled 2, the RPZ application 130 generates the RPZ 140. The RPZ 140 includes the resource record 142(1) that maps the domain name "example.com" to the alias "example.com.PoisonIvy.Malware-C2.CyberEspionage. HIGH.blackhole.tld."

Notably, the context for the on-line threats that are associated with the domain name "example.com" is embedded in the alias as a sequence of subdomain labels: "PoisonIvy," "Malware-C2," "CyberEspionage," and "HIGH." The subdomain labels are proceeded by the domain name of "example.com" and followed by a high-level domain name of "blackhole.tld." The alias does not specify a domain that exists in the DNS. As depicted with the circle labeled 3, the RPZ application 130 then transmits the RPZ 140 to the recursive resolver 150. Although not shown, the recursive resolver 150 enables the RPZ 140 as per the DNS protocol.

Subsequently, as depicted with the circle labeled 4, the client 170 transmits the DNS query 180 to the recursive resolver 150. The DNS query 180 includes the domain name "example.com." As part of executing the DNS resolution process, the recursive resolver 150 maps the domain name "example.com" to the alias. Because the alias does not specify a domain that exists in the DNS, the recursive resolver 150 generates the DNS response 190 that specifies that the alias is a non-existent domain name. As depicted with the circle labeled 5, the recursive resolver 150 transmits the DNS response 190 to the client 170. Upon receiving the DNS response 190, the client 170 can identify the context for the on-line threats that are associated with the domain name "example.com" directly based on the DNS response 190.

The descriptions of the various embodiments have been presented for purposes of illustration, but are not intended to be exhaustive or limited to the embodiments disclosed. Further, the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to generating response policy zones that map domain names to aliases reflecting contexts for the on-line threats that are associated with the domain names in a systematic fashion.

Figure 2:
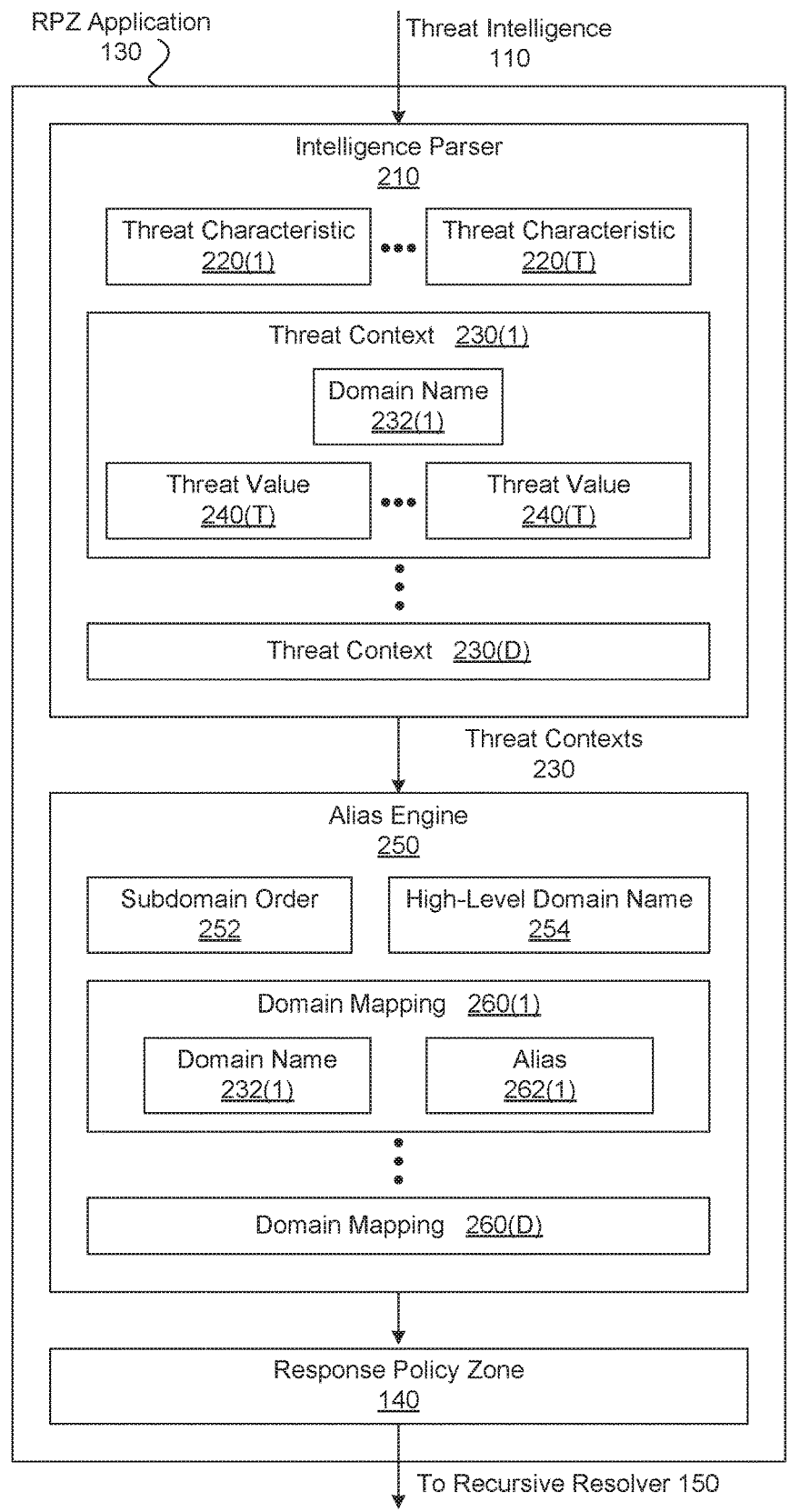
FIG. 2 is a more detailed illustration of the response policy zone application of FIG. 1, according to various embodiments of the present invention.

FIG. 2 is a more detailed illustration of the response policy zone (RPZ) application 130 of FIG. 2, according to various embodiments of the present invention. As shown, the RPZ application 130 includes, without limitation, an intelligence parser 210, an alias engine 250, and the RPZ 140. In general, the RPZ application 130 receives the threat intelligence 110, generates the RPZ 140 based on the threat intelligence 110, and transmits the RPZ 140 to the recursive resolver 150.

As shown, the intelligence parser 210 includes, without limitation, any number of threat characteristics 220 and one or more threat contexts 230. Each of the threat characteristics 220 specifies a characteristic of a context for the on-line threats that are associated with a domain name. For example, the threat characteristics 220 could include a malware family, a threat type, and a severity, to name a few. The intelligence parser 210 may be configured to define any number of threat characteristics 220 in any technically feasible fashion.

For example, the intelligence parser 210 could be configured to define the threat characteristics 220 based on input received via a graphical user interface (GUI) or an application programming interface (API). As part of receiving the input for each threat characteristic 220, the intelligence parser 210 could receive a range of acceptable values for the threat characteristic 220. In another example, the intelligence parser 210 could include code that specifies static, predetermined threat characteristics 220.

In operation, the intelligence parser 210 parses the threat intelligence 110 based on the threat characteristics 220 to generate the threat contexts 230. As shown, each of the threat contexts 230 includes, without limitation, a domain name 232 and one or more threat values 240. For each of the threat contexts 230, the domain name 232 specifies the name of a domain that is associated with at least one on-line threat. In a complementary fashion, each of the threat values 240 describes a different one of the threat characteristics 220 for the on-line threats that are associated with the domain name 232. In this fashion, for each of the threat contexts 230, there is a one-to-one correspondence between the threat values 240 and the threat characteristics 220.

More precisely, the threat value 240(1) describes the threat characteristics 220(1), the threat value 240(2) describes the threat characteristic 220(2), and so forth. In general, the number of threat contexts 230 is equal to the number of domain names 232 that are associated with on-line threats as per the threat intelligence 210. Further, for each of the threat contexts 230, the number of the threat values 240 equals the number of the threat characteristics 220. After generating the threat contexts 230, the intelligence parser 210 transmits the threat contexts 230 to the alias engine 250.

As shown, the alias engine 250 includes, without limitation, a subdomain order 252, a high-level domain name 254, and one or more domain mappings 260. For each of the threat contexts 230, the alias engine 250 generates a domain mapping 260 that specifies the domain name 232 included in the threat context 230 and an alias 262 that corresponds to the domain name 232. The alias engine 250 generates the alias 262(x) based on the domain name 232(x), the threat values 240 included in the threat context 230(x), the subdomain order 252, and the high-level domain name 254.

First, the alias engine 250 generates a subdomain label for each of the threat values 240. In general, the subdomain label reflects the threat value in an intuitive manner while complying with DNS restrictions involving subdomain labels. The alias engine 250 then concatenates the subdomain labels with a period delimiter based on the subdomain order 252 to generate a threat sting. Notably, the subdomain order 252 specifies a left-to-right order of the threat characteristics 220 (and the corresponding threat values 240) with respect to the aliases 262

The alias engine 250 may be configured to define the subdomain order 252 in any technically feasible fashion. For example, the alias engine 250 could obtain the subdomain order 252 via a GUI or an API. In another example, the alias engine 250 could include code that defines a static, predetermined subdomain order 252. In some embodiments, the subdomain order 252 reflects a utilitarian order of the threat characteristics 220 that facilitates performing any number of mapping operations, analysis operations, comparison operations, etc., via wildcard characters.

For example, suppose that the threat characteristic 220(4) of "severity" was the most important threat characteristic 220 with respect to threat analysis operations performed by the client 170. To facilitate identification of the domain names 232 based on the threat characteristic 220(4), the subdomain order 252 could designate the subdomain labels representing the threat values 240(4) as the rightmost of the subdomain labels within the threat string. To identify the domain names 232 associated with a high level of severity, the client 170 could search the DNS log or DNS responses 190 for threat strings matching "*.HIGH".

Subsequently, the alias engine 250 prepends the domain name 232(x) to the threat string with a period delimiter to generate a second string. Finally, the alias engine 250 appends the high-level domain name 254 to the second string with a period delimiter to generate the alias 262(x). The alias engine 250 may determine the high-level domain name 254 in any technically feasible fashion. For example, the alias engine 250 could obtain the high-level domain name 254 via a GUI or an API. In another example, the alias engine 250 could include code that defines a static, predetermined high-level domain name 254.

Notably, the high-level domain name 254 may or may not specify a domain that exists in the DNS (i.e., maps to an IP address). For example, the high-level domain name 254 could specify a walled garden or a website that provides security-related information. In another example, the high-level domain name 254 could be mapped to an existent IP address or a non-existent IP address using any technically feasible DNS protocol. In yet another example, no resource record 142 in the DNS either directly or indirectly maps the high-level domain name 254 to an IP address and, consequently, the high-level domain name 254 does not specify a domain that exists in the DNS.

For each of the domain mappings 260, the alias engine 250 generates a Canonical name (CNAME) record that maps the domain name 232 to the alias 262. After the RPZ application 130 includes the CNAME records in the RPZ 140, the RPZ application 130 transmits the RPZ 140 to the recursive resolver 150. In various embodiments, the alias engine 250 may generate any number of additional resources records 142 and include the additional resource records 142 in the RPZ 140. As described in conjunction with FIG. 1, the additional resource records 142 may further customize the domain resolution process for the domain names 232 that are associated with on-line threats.

In some alternate embodiments, the alias engine 250 may generate additional resource records 142 that configure name servers to map certain domain names based on a "normal" DNS resolution process. For instance, in some embodiments, the alias engine 250 may determine that a particular domain name is not malicious based on a whitelist. The alias engine 250 may then generate an RPZ-passthru resource record 142 and include the RPZ passthru resource record 142 in the RPZ 140. When the RPZ 140 is enabled for a name server, the RPZ-passthru resource record 142 configures the name server to ignore any other resource records 142 included in the RPZ 140 when executing the DNS resolution operations for the domain name. As a result, the name server executes the DNS resolution process for the domain name as if the RPZ 140 were not enabled.

In alternate embodiments, the RPZ application 130 may be customized to generate any number of the RPZs 140 and transmit any number of the RPZs 140 to any number of name servers in any combination. For instance, in some embodiments, the RPZ application 130 generates different RPZs 140 for different targets, such as different clients 170 or different name servers. For each target, the intelligence parser 210 includes target-specific threat characteristics 220. Consequently, the intelligence parser 210 generates target-specific threat contexts 230. For each target, the alias engine 250 includes a target-specific subdomain order 252 and a target-specific high-level domain name 254. Upon receiving the target-specific threat contexts 230, the alias engine 250 generates target-specific aliases 262 and includes the target-specific aliases 262 in target-specific domain mappings 260. Finally, for each target, the alias engine 250 generates a target-specific RPZ 140, and the RPZ application 130 transmits the target-specific RPZ 140 to the target.

In various embodiments, the functionality of the RPZ application 130 is integrated into or distributed across any number (including one) of software applications that are stored and executed in any technically feasible fashion. For example, in some embodiments, the intelligence parser 210 is included in a STIX parsing application, and the alias engine 250 is included in a GUI-based RPZ configuration application. Further, the intelligence parser 210 could reside in one cloud or distributed computing system, while the alias engine 250 could reside in a different cloud or distributed computing system. The RPZ application 130, the intelligence parser 210, and the alias engine 250 described herein are not limited to any particular computing system and may be adapted to take advantage of new computing systems as they become available.

In some embodiments, any number of the RPZ application 130, the intelligence parser 210, and the alias engine 250 may be stored on computer readable media such as a CD-ROM, DVD-ROM, flash memory module, or other tangible storage media. Further, in some embodiments, the RPZ application 130, the intelligence parser 210, and/or the alias engine 250 may be provided as an application program (or programs) stored on computer readable media such as a CD-ROM, DVD-ROM, flash memory module, or other tangible storage media.

Generating Response Policy Zones

FIGS. 3A-3D illustrate a sequence of operations performed by the response policy zone (RPZ) application 130 of FIG. 2 when generating the response policy zone 140, according to various embodiments of the present invention. In alternate embodiments, the RPZ application 130 may generate any number of the RPZs 140 in response to any event and for any number of different name servers, such as the recursive resolver 150.

Initially, as depicted in FIG. 3A, the intelligence parser 210 receives the threat intelligence 110. As shown, the threat intelligence 110 is a file written in a Structured Threat Information Expression (STIX) format. The threat intelligence 110 specifies that "example.com" is associated with an on-line threat associated with a malware family of "PoisonIvy." The threat intelligence 110 further specifies that the on-line threat was last seen as "Malware-C2," is of a threat type "CyberEspionage," and has a "HIGH" severity level.

As depicted in FIG. 3B, the intelligence parser 210 generates the threat contexts 230 based on the threat intelligence 110 and the threat characteristics 220. In general, for each domain name 232 that is associated with one or more on-line threats, the intelligence parser 210 generates the threat context 230 that includes, without limitation, the domain name 232 and the four threat values 240(1)-240(4). The four threat values 240(1)-240(4) correspond to, respectively, the four threat characteristics 220(1)-220(4) of "mal-ware_family," "last_seen_as," "threat_type," and "severity." Accordingly, as shown, the intelligence parser 210 generates the threat context 230(1) that includes the domain name 232(1) of "example.com" and the threat values 240(1)-240(4) of, respectively, "PoisonIvy," "Malware-C2," "CyberEspionage," and "HIGH."

Figure 3C:
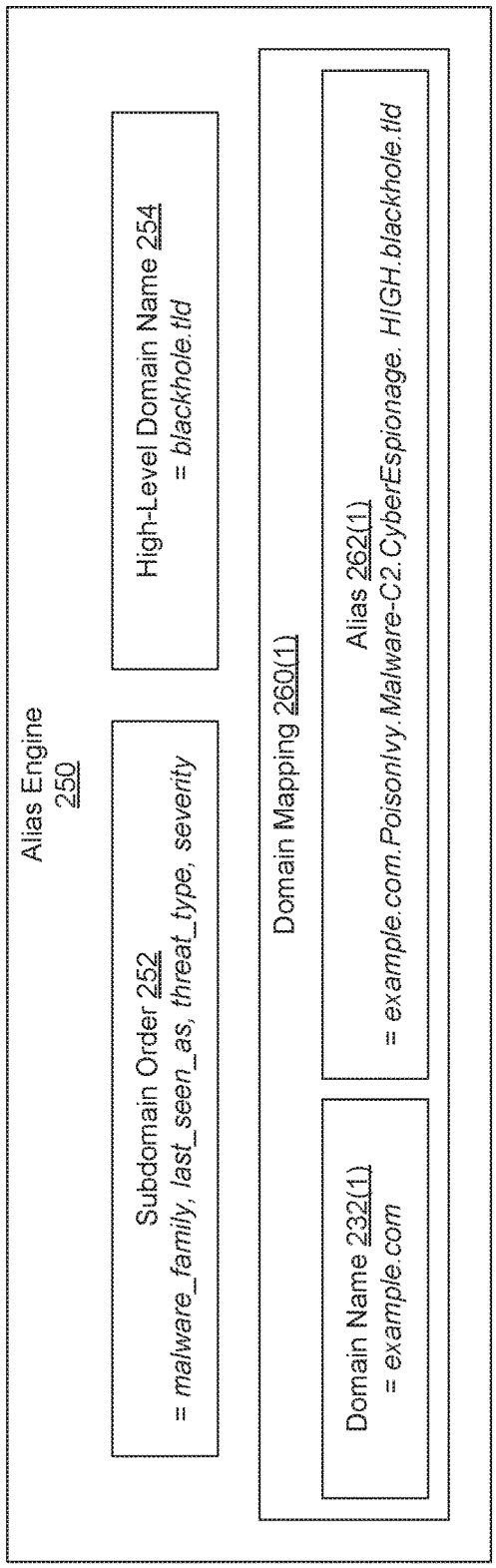

Subsequently, as depicted in FIG. 3C, the alias engine 250 generates the domain mappings 260 based on the threat contexts 230. In general, for each of the threat contexts 230, the alias engine 250 generates the domain mapping 260 that includes, without limitation, the domain name 232 and the corresponding alias 262. The intelligence parser 210 generates the alias 262 based on the domain characteristics 230, the subdomain order 252 of "malware family, last_seen_as, threat_type, severity," and the top-level domain name 254 of "blackhole.tld." Accordingly, as shown, the intelligence parser 210 generates the domain mapping 260(1) that includes the domain name 232(1) of "example.com" and the alias 262(1) of "example.com.PoisonIvy.Malware-C2.CyberEspionage.HIGH.blackhole.tld."

Figure 3D:
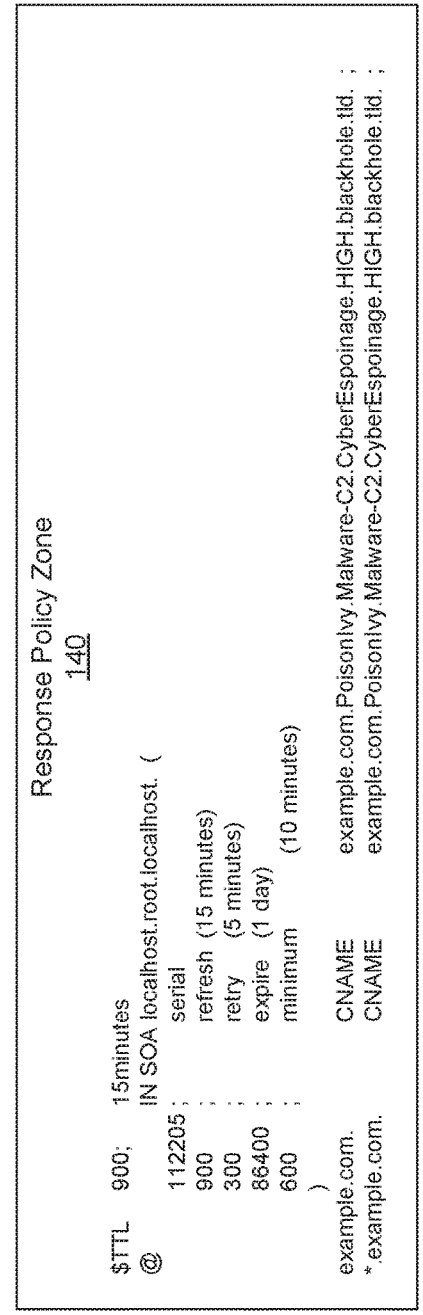

Finally, as depicted in FIG. 3D, the alias engine 250 generates the RPZ 140 based on the domain mappings 260. In general, for each of the domain mappings 260, the alias engine 250 generates two resource records 142. First, the alias engine 250 generates a Canonical name (CNAME) record that maps the domain name 232 to the alias 262. Second, the alias engine 250 generates a CNAME record that maps subdomain names associated with the domain name 232 to the alias 262 based on a wildcard character of "*". As shown, the alias engine 250 generates the CNAME records that map the domain name 232(1) of "example.com" and the subdomain names associated with the domain name 232(1) to the alias 262(1) of "example.com.PoisonIvy.Malware-C2.CyberEspionage.HIGH.blackhole.tld." Further, the alias engine 250 generates any additional resource records 142, such as a start of authority (SOA) record depicted in FIG. 3D, that includes information associated with the RPZ 140.

In alternate embodiments, the RPZ application 130 may perform any number of parsing, synthesis, and generation operations to generate any number of the resource records 142 that specify contexts for the on-line threats that are associated with the domain names 232 in any technically feasible fashion. For instance, in various embodiments, the RPZ application 130 may determine the domain names 232 and generate the corresponding aliases 262 in any technically feasible fashion that is based on at least a portion of the threat intelligence 110. Subsequently, the RPZ application 130 may generate any number of the resource records 142 that, together, comprise the RPZ 140 and map at least the domain names 232 to the corresponding aliases 262 in any technically feasible fashion.

Figure 4:
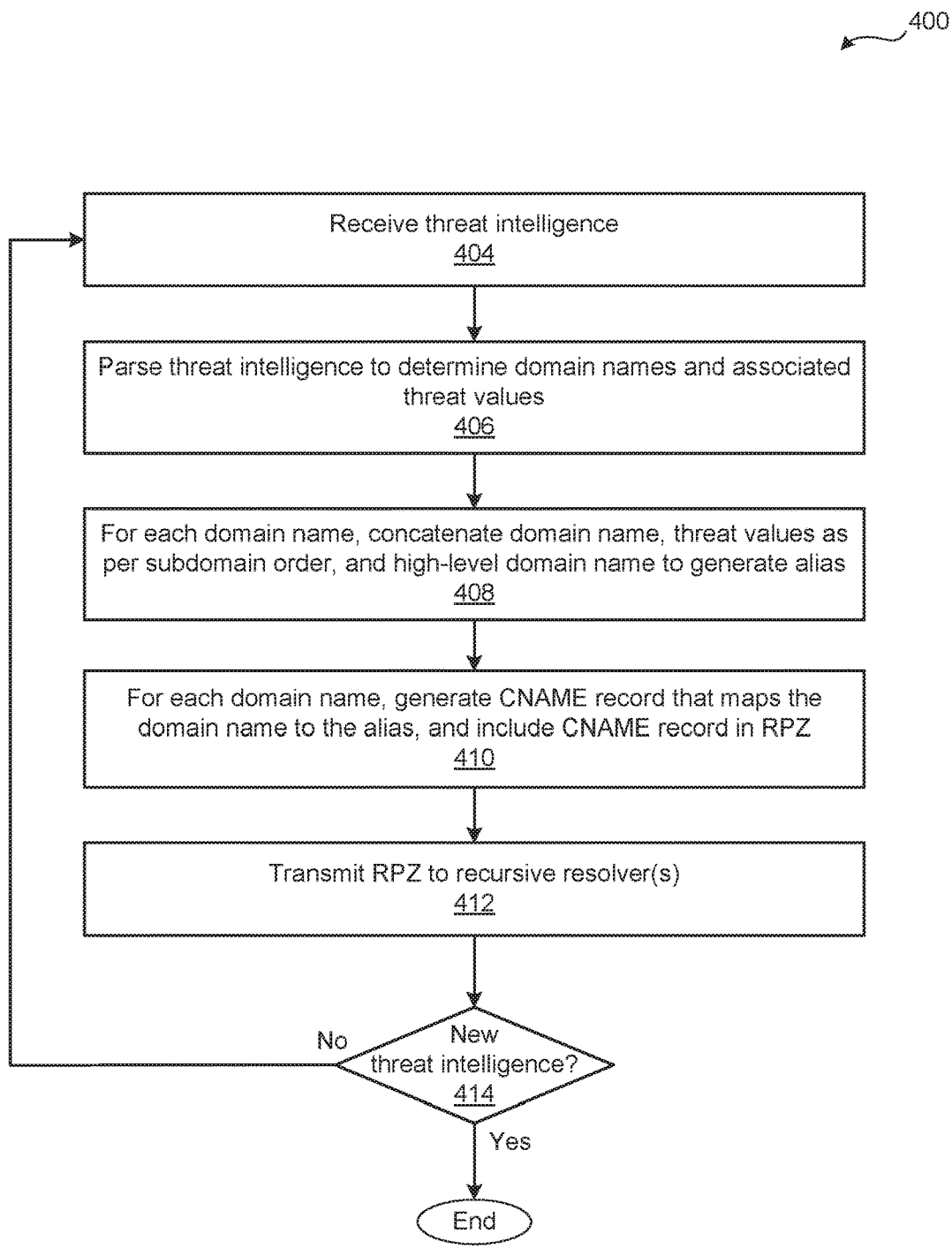
FIG. 4 is a flow diagram of method steps establishing and providing relevant contexts for on-line threats that are associated with domain names, according to various embodiments of the present invention.

FIG. 4 is a flow diagram of method steps establishing and providing relevant contexts for on-line threats that are associated with domain names, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 404, where the intelligence parser 210 receives the threat intelligence 110. The intelligence parser 210 may receive the threat intelligence 110 in any technically feasible fashion. For example, the intelligence parser 210 could receive a file that is written in a Structured Threat Information Expression (STIX) format, an Open Indicators of Compromise (OpenIOC) format, or a Cyber Observable Expression (CybOX) format.

At step 406, the intelligence parser 210 performs parsing operations on the threat intelligence 110 to determine one or more domain names 232 and associated threat values 240. Each of the domain names 232 is associated with at least one on-line threat, and each of the associated threat values 240 describes a different threat characteristic 220. The intelligence parser 210 may determine the threat characteristics 220 in any technically feasible fashion. For example, the intelligence parser 210 could obtain the threat characteristics 220 via a graphical user interface (GUI), and the threat characteristics 220 could vary based on the recursive resolver 150 and/or the client 170.

At step 408, for each of the domain names 232, the alias engine 250 generates the alias 262 based on the domain name 232, the threat values 240, and the high level domain name 254. More precisely, for each of the threat values 240, the alias engine 250 generates a subdomain label that reflects the threat value 240. The alias engine 250 then concatenates the subdomain labels with a period deliminator based on the subdomain order 252 to generate a threat string.

The subdomain order 252 specified a left-to-right order of the threat values 240 within the threat string based on the threat characteristics 220. The alias engine 250 may determine the subdomain order 252 in any technically feasible fashion. For example, the alias engine 250 could obtain the subdomain order 252 via a GUI, and the subdomain order 252 could vary based on the threat characteristics 220, the recursive resolver 150, and/or the client 170. In some embodiments, the subdomain order 252 reflects a utilitarian order of the threat characteristics 220 that facilitates performing any number of mapping operations, analysis operations, comparison operations, etc., via wildcard characters.

Subsequently, the alias engine 250 prepends the domain name 232 to the threat string with a period deliminator to generate a second string. Finally, the alias engine 240 appends the high level domain name 254 to the second string to generate the alias 262. The alias engine 250 may determine the high level domain name 254 in any technically feasible fashion. For example, the alias engine 250 could obtain the high level domain name 254 via a GUI, and the high level domain name 254 could vary based on the recursive resolver 150 and/or the client 170. In alternate embodiments, the alias engine 250 may embed the threat intelligence 110 associated with the domain name 232 into the alias 262 associated with the domain name 232 in any technically feasible fashion.

At step 410, for each domain name 232, the alias engine 250 generates a Canonical name record (CNAME) record that maps the domain name 232 to the alias 262 and includes the CNAME record in the RPZ 140. The alias engine 250 may generate the CNAME record in any technically feasible fashion that is consistent with the DNS. In alternate embodiments, the alias engine 250 may generate any number and type of the resource records 142 in addition or instead of the CNAME records.

For example, for each domain name 232, the alias engine 250 could generate an additional CNAME record that maps the subdomains of the domain name 232 to the alias 262 via a wildcard character. In another example, the alias engine 250 could generate an additional CNAME record that maps the alias 262 to a period to indicate that the alias 262 does not exist as a domain in the DNS. The alias engine 250 may be configured to customize the resource records 142 associated with the domain name 232 in any technically feasible fashion. For example, the alias engine 250 could be configured via a GUI to generate additional resource records 142 that enable a specific error handling process associated with the recursive resolvers 150 and/or the client 170.

At step 412, the RPZ application 130 transmits the RPZ 140 to the recursive resolver 150. In alternate embodiments, the RPZ application 130 may transmit the RPZ 140 to any number of recursive resolvers 150 associated with any number of clients 170. Further, in various embodiments, the alias engine 250 may generate any number of different RPZs 140. Each of the RPZs 140 may include different resource records 142 based on different high level domain names 254, subdomain orders 254, and the like, that are associated with different recursive resolvers 150 and/or clients 170. Accordingly, the RPZ application 130 may transmit any number of the RPZs 140 to each of any number of different recursive resolvers 150. The RPZ application 130 may transmit the RPZ 140 in any technically feasible fashion. For example, the RPZ application 130 could transmit an entirety of the RPZ 140 via an Authoritative Zone Transfer (AXFR). Alternatively or subsequently, the alias engine 250 could transmit portions of the RPZ 140 incrementally via any number of Incremental Zone Transfers (IXFRs).

When a recursive resolver 150 enables the RPZ 140, the RPZ 140 causes the recursive resolver 150 to map each of the domain names 232 that are associated with on-line threats to the corresponding alias 262. Advantageously, the alias 262 specifies the associated domain name 232 as well as a context for the on-line threats that are associated with the domain name 232. Further, the recursive resolver 150 may implement any additional DNS mechanisms, including additional RPZs, to tailor the DNS resolution process based on the aliases 262. For example, the recursive resolver 150 could enable an additional RPZ that maps aliases 262 with an embedded threat value 240 of "LOW" for the threat characteristic 220(4) of "severity" to a domain name specifying a walled garden.

At step 414, the RPZ application 130 determines whether there is new threat intelligence 110. If, at step 414, the RPZ application 130 determines that there is new threat intelligence 110, then the method 400 returns to step 404, where the RPZ application 130 processes the new threat intelligence 110. If, however, at step 414, the RPZ application 130 determines that there is no new threat intelligence 110, then the method 400 terminates. In this fashion, the RPZ application 130 continually updates the RPZ 140 that protect the clients 170 from on-line threats that are associated with "malicious" domain names 232 while providing the contexts for the on-line threats that are associated with the malicious domain names 232. In alternate embodiments, the RPZ application 130 may be configured to regenerate the RPZ 140 in response to any number and type of event, such as at a predetermined time interval.

In sum, the disclosed techniques generate RPZs that provide contexts for the on-line threats that are associated with domain names. An RPZ application includes, without limitation, an intelligence parser and an alias engine. The intelligence parser receives and parses intelligence information that includes domain names, information that describes the on-line threats that are associated with the domain names, and any amount of additional threat-related data. For each domain name, the intelligence parser determines corresponding threat values for threat characteristics and generates an alias based on the domain name and the associated threat values. For each domain name, the alias engine then generates a Canonical Name (CNAME) record that maps the domain name to the corresponding alias. The alias engine may also generate one or more additional CNAME resource records. For example, for each domain name, the alias engine could generate a CNAME record that includes a wildcard character that maps the associated subdomain names to the corresponding alias. Together, the CNAME records form an RPZ.

Advantageously, the techniques described herein enable a DNS name server to provide a context for the on-line threats that are associated with domain names when mitigating the on-line threats. For instance, in some embodiments, the aliases included in the RPZ do not map to IP addresses. Upon receiving a DNS query including a "malicious" domain name that is thought to be associated with one or more on-line threats, the DNS name server generates a DNS response indicating that the corresponding alias does not exist. Because the relevant context is embedded in the alias, the DNS response itself provides the relevant context. By contrast, identifying a context for on-line threats that are mitigated via a conventionally generated RPZ involve time consuming correlation operations and typically provides a limited context, such as a threat category.

1. In some embodiments, a method for providing contexts for on-line threats that are associated with domain names comprises determining a specification of a first threat characteristic of an on-line threat based on threat intelligence information, wherein the on-line threat is associated with a first domain name; generating a first alias based on the first domain name and the specification of the first threat characteristic; generating a first DNS resource record that maps the first domain name to the first alias; and transmitting a response policy zone (RPZ) that includes the first DNS resource record to a DNS name server that implements the RPZ to mitigate on-line threats.

2. The method of clause 1, wherein the specification of the first threat characteristic describes a severity, a threat type, or a malware family associated with the on-line threat.

3. The method of clauses 1 or 2, wherein generating the first alias comprises performing a concatenation operation between a first subdomain label associated with the specification of the first threat characteristic and a first string associated with a specification of a second threat characteristic of the on-line threat to generate a second string; prepending the first domain name to the second string to generate a third string; and appending a high-level domain name to the third string.

4. The method of any of clauses 1-3, wherein the first string includes at least a second subdomain label associated with the specification of the second threat characteristic.

5. The method of any of clauses 1-4, wherein the concatenation operation is performed based on a concatenation order that reflects a first importance of the first characteristic with respect to a threat analysis process relative to a second importance of the second characteristic with respect to the threat analysis process.

6. The method of any of clauses 1-5, further comprising performing one or more parsing operations on a file that is written in a Structured Threat Information Expression (STIX) format, an Open Indicators of Compromise (OpenIOC) format, or a Cyber Observable Expression (CybOX) format to determine the threat intelligence information.

7. The method of any of clauses 1-6, further comprising generating a second DNS resource record that maps the first alias to an Internet Protocol address or specifies that the first alias is a non-existent domain name, wherein the RPZ also includes the second DNS resource record.

8. The method of any of clauses 1-7, wherein the first DNS resource record comprises a Canonical name record.

9. In some embodiments, a computer-readable storage medium including instructions that, when executed by a processor, configure the processor to perform the steps of determining a specification of a first threat characteristic of an on-line threat based on threat intelligence information, wherein the on-line threat is associated with a first domain name; generating a first alias based on the first domain name and the specification of the first threat characteristic; generating a first DNS resource record that maps the first domain name to the first alias; and transmitting a response policy zone (RPZ) that includes the first DNS resource record to a DNS name server that implements the RPZ to mitigate on-line threats.

10. The computer-readable storage medium of clause 9, wherein the specification of the first characteristic describes at least one of content or activities that are thought to be non legitimate.

11. The computer-readable storage medium of clauses 9 or 10, wherein generating the first alias comprises performing a concatenation operation between a first subdomain label associated with the specification of the first threat characteristic and a first string associated with a specification of a second threat characteristic of the on-line threat to generate a second string; prepending the first domain name to the second string to generate a third string; and appending a high-level domain name to the third string.

12. The computer-readable storage medium of any of clauses 9-11, wherein the first string includes at least a second subdomain label associated with the specification of the second threat characteristic.

13. The computer-readable storage medium of any of clauses 9-12, wherein the concatenation operation is performed based on a concatenation order that reflects a first importance of the first characteristic with respect to a threat analysis process relative to a second importance of the second characteristic with respect to the threat analysis process.

14. The computer-readable storage medium of any of clauses 9-13, wherein the first DNS resource record comprises a Canonical name record.

15. The computer-readable storage medium of any of clauses 9-14, further comprising determining that a second domain name is not malicious based on the threat intelligence information; and generating a second DNS resource record that causes the name server to return an IP address associated with the second domain name.

16. The computer-readable storage medium of any of clauses 9-15, further comprising generating a second DNS resource record that maps a subdomain name associated with the first domain name to either the first alias or a second alias that is derived from the first alias.

17. In some embodiments, a system comprises a memory storing a response policy zone (RPZ) application; and a processor that is coupled to the memory, wherein, when executed by the processor, the RPZ application configures the processor to determine a specification of a first threat characteristic of an on-line threat based on threat intelligence information, wherein the on-line threat is associated with a first domain name; generate a first alias based on the first domain name and the specification of the first threat characteristic; generate a first DNS resource record that maps the first domain name to the first alias; and transmit an RPZ that includes the first DNS resource record to a DNS name server that implements the RPZ to mitigate on-line threats.

18. The system of clause 17, wherein the specification of the first threat characteristic describes a severity, a threat type, or a malware family associated with the on-line threat.

19. The system of clauses 17 or 18, wherein the RPZ application configures the processor to generate the first alias by performing a concatenation operation between a first subdomain label associated with the specification of the first threat characteristic and a first string associated with a specification of a second threat characteristic of the on-line threat to generate a second string; prepending the first domain name to the second string to generate a third string; and appending a high-level domain name to the third string.

20. The system of any of clauses 17-19, wherein the first DNS resource record comprises a Canonical name record.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for providing contexts for on-line threats that are associated with domain names, the method comprising:
   determining, based on threat intelligence information, one or more threat values associated with an on-line threat that is associated with a first domain name;
   generating, based on the first domain name and the one or more threat values, a first alias for the first domain name;
   generating a first DNS resource record that maps the first domain name to the first alias; and
   transmitting a response policy zone (RPZ) that includes the first DNS resource record to a DNS name server that implements the RPZ to mitigate on-line threats.

2. The computer-implemented method of claim 1, wherein the one or more threat values describes at least one of a severity, a threat type, or a malware family associated with the on-line threat.

3. The computer-implemented method of claim 1, wherein generating the first alias comprises:
   performing a concatenation operation between a first subdomain label associated with a first threat value included in the one or more threat values and a first string associated with a second threat value included in the one or more threat values to generate a second string;
   prepending the first domain name to the second string to generate a third string; and
   appending a high-level domain name to the third string.

4. The computer-implemented method of claim 3, wherein the first string includes at least a second subdomain label associated with the the second threat value.

5. The computer-implemented method of claim 3, wherein the concatenation operation is performed based on a concatenation order that reflects a first importance of the first threat value with respect to a threat analysis process relative to a second importance of the second threat value with respect to the threat analysis process.

6. The computer-implemented method of claim 1, further comprising performing one or more parsing operations on a file that is written in a Structured Threat Information Expression (STIX) format, an Open Indicators of Compromise (OpenIOC) format, or a Cyber Observable Expression (CybOX) format to determine the threat intelligence information.

7. The computer-implemented method of claim 1, further comprising generating a second DNS resource record that maps the first alias to an Internet Protocol address or specifies that the first alias is a non-existent domain name, wherein the RPZ also includes the second DNS resource record.

8. The computer-implemented method of claim 1, wherein the first DNS resource record comprises a Canonical name record.

9. One or more non-transitory computer-readable storage media including instructions that, when executed by one or more processors, cause the one or more processors to perform the steps of:
    determining, based on threat intelligence information, one or more threat values associated with an on-line threat that is associated with a first domain name;
    generating, based on the first domain name and the one or more threat values, a first alias for the first domain name;
    generating a first DNS resource record that maps the first domain name to the first alias; and
    transmitting a response policy zone (RPZ) that includes the first DNS resource record to a DNS name server that implements the RPZ to mitigate on-line threats.

10. The one or more non-transitory computer-readable storage media of claim 9, wherein the one or more threat values describes at least one of content or activities that classified as non-legitimate.

11. The one or more non-transitory computer-readable storage media of claim 9, wherein generating the first alias comprises:
    performing a concatenation operation between a first subdomain label associated with a first threat value included in the one or more threat values and a first string associated with a second threat value included in the one or more threat values to generate a second string;
    prepending the first domain name to the second string to generate a third string; and
    appending a high-level domain name to the third string.

12. The one or more non-transitory computer-readable storage media of claim 11, wherein the first string includes at least a second subdomain label associated with the second threat value.

13. The one or more non-transitory computer-readable storage media of claim 11, wherein the concatenation operation is performed based on a concatenation order that reflects a first importance of the first threat value with respect to a threat analysis process relative to a second importance of the second threat value with respect to the threat analysis process.

14. The one or more non-transitory computer-readable storage media of claim 9, wherein the first DNS resource record comprises a Canonical name record.

15. The one or more non-transitory computer-readable storage media of claim 9, further comprising instructions that, when executed by the one or more processors, cause the one or more processors to perform the steps of:
    determining, based on the threat intelligence information, that a second domain name is not malicious; and
    generating a second DNS resource record that causes the DNS name server to return an IP address associated with the second domain name.

16. The one or more non-transitory computer-readable storage media of claim 9, further comprising instructions that, when executed by the one or more processors, cause the one or more processors to perform the step of generating a second DNS resource record that maps a subdomain name associated with the first domain name to either the first alias or a second alias that is derived from the first alias.

17. A system comprising:
    a memory storing a response policy zone (RPZ) application; and
    a processor that is coupled to the memory that executes the RPZ application to:
        determine, based on threat intelligence, one or more threat values an on-line threat that is associated with a first domain name;
        generate, on the first domain name and the one or more threat values, a first alias for the first domain name;
        generate a first DNS resource record that maps the first domain name to the first alias; and
        transmit an RPZ that includes the first DNS resource record to a DNS name server that implements the RPZ to mitigate on-line threats.

18. The system of claim 17, wherein the one or more threat values describes at least one of a severity, a threat type, or a malware family associated with the on-line threat.

19. The system of claim 17, wherein the processor executes the RPZ application to generate the first alias by:
    performing a concatenation operation between a first subdomain label associated with a first threat value included in the one or more threat values and a first string associated with a second threat value included in the one or more threat values to generate a second string;
    prepending the first domain name to the second string to generate a third string; and
    appending a high-level domain name to the third string.

20. The system of claim 17, wherein the first DNS resource record comprises a Canonical name record.

* * * * *